(12) United States Patent
Ganesan et al.

(10) Patent No.: US 11,647,105 B1
(45) Date of Patent: May 9, 2023

(54) GENERATING MULTI-LAYER CONFIGURATION TEMPLATES FOR DEPLOYMENT ACROSS MULTIPLE INFRASTRUCTURE STACK LAYERS

(71) Applicant: Dell Products L.P., Round Rock, TX (US)

(72) Inventors: Vaideeswaran Ganesan, Bangalore (IN); Pravin Janakiram, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/586,112

(22) Filed: Jan. 27, 2022

(51) Int. Cl.
  *H04L 41/084* (2022.01)
  *H04L 69/16* (2022.01)
  *H04L 69/22* (2022.01)
  *H04L 69/00* (2022.01)

(52) U.S. Cl.
  CPC ............ *H04L 69/161* (2013.01); *H04L 69/22* (2013.01); *H04L 69/26* (2013.01); *H04L 41/084* (2013.01)

(58) Field of Classification Search
  None
  See application file for complete search history.

(56) References Cited

U.S. PATENT DOCUMENTS

| 11,216,014 | B1* | 1/2022 | Mishra | G06V 20/188 |
| 2020/0099583 | A1* | 3/2020 | Arko | H04L 67/303 |
| 2020/0142811 | A1* | 5/2020 | Sadykov | G06F 40/186 |
| 2020/0374194 | A1* | 11/2020 | Laribi | H04L 41/40 |

OTHER PUBLICATIONS

Baseline and Configuration Drift Management, Network Configuration Manager (/network-configuration-manager), pp. 1-8, https://www.solarwinds.com/network-configuration-manager/use-cases/baseline-config-drift-management, downloaded Jan. 26, 2022.

(Continued)

*Primary Examiner* — James A Edwards
(74) *Attorney, Agent, or Firm* — Ryan, Mason & Lewis, LLP

(57) ABSTRACT

Techniques are provided for generating multi-layer configuration templates for deployment across multiple infrastructure stack layers. One method comprises evaluating a semantic equivalence of attributes in an attribute registry to identify common attributes that appear in multiple stack layers; identifying architecture-specific attributes that are distinct from the common attributes; obtaining a semantic attribute group comprising related attributes; determining a semantic attribute group configuration for the related attributes by evaluating a configuration of the related attributes identified in a deployment configuration and/or a reference template configuration comprising the related attributes; and generating a configuration template for configuring multiple server devices, wherein the configuration template comprises (i) a first portion that configures the common attributes based on a configuration in the reference template configuration, and (ii) multiple second portions, wherein each second portion comprises an architecture-specific configuration of the architecture-specific attributes for a corresponding architecture-specific infrastructure stack type.

20 Claims, 18 Drawing Sheets

(56) References Cited

OTHER PUBLICATIONS

AWS CloudFormation Best Practices, AWS CloudFormation, pp. 1-5, https://docs.aws.amazon.com/AWSCloudFormation/latest/UserGuide/best-practices.html, downloaded Jan. 26, 2022.
Customizing a Template for Oracle Cloud Stack, Oracle Help Center, pp. 1-6. https://docs.oracle.com/en/cloud/paas/cloud-stack-manager/tutorial-stack-template-customize/, downloaded Jan. 26, 2022.

* cited by examiner

600

PROCESS ATTRIBUTE REGISTRIES AND INFRASTRUCTURE STACK CONFIGURATION FILES, AS FOLLOWS:

a.    CREATE ATTRIBUTE REGISTRIES AT MULTIPLE LEVELS b.    FIND SEMANTIC EQUIVALENCE OF ATTRIBUTES AT EACH LAYER TO IDENTIFY COMMON ATTRIBUTES, AND THE CONTROL POINT WHERE EACH COMMON ATTRIBUTE CAN BE MODIFIED (FIG. 10A)

c.    PERFORM SEMANTIC ATTRIBUTE GROUP DISCOVERY TO GROUP TOGETHER RELATED ATTRIBUTES (FIG. 11A)

d.    PERFORM SEMANTIC GROUP POLICY DISCOVERY TO OBTAIN CONFIGURATION OF SEMANTIC ATTRIBUTE GROUPS (FIG. 12A)

e.    PERFORM CONFIGURATION TEMPLATE CREATION (FIG. 13):

i.    SEPARATE COMMON PORTIONS AND ARCHITECTURE-SPECIFIC PORTIONS ii.    COMMON PORTIONS FORM FIRST PORTION OF CONFIGURATION TEMPLATE iii.    PROPOSE SEMANTIC GROUP POLICIES FOR ARCHITECTURE-SPECIFIC CONFIGURATION PORTIONS OF CONFIGURATION TEMPLATE

FIG. 6

COMMON ATTRIBUTES 740 FOR HARDWARE
ARCHITECTURES OF FIG. 7A

```
SSH.1#Enable                WebServer.1#Timeout
SSH.1#Port                  WebServer.1#HttpsPort
SSH.1#MaxSessions           WebServer.1#WebserverEnable
SSH.1#Timeout               Preference.1#DeviceName
Users.1#userType            TimeConfig.1#NTPEnable
Users.1#SHA256Password      TimeConfig.1#NTPServer1
Users.1#Name                TimeConfig.1#NTPServer2
Users.1#Privilege           TimeConfig.1#NTPServer3
Users.1#Enable
Users.1#Password
```

FIG. 7B

ARCHITECTURE-SPECIFIC ATTRIBUTES 750 FOR
CHASSIS ARCHITECTURE OF FIG. 7A

```
ChassisPower.1#SystemInputPowerCap
ChassisPower.1#RedundancyPolicy
ChassisPower.1#EnablePowerCap
Power#EnableHotSpare
Power#PrimaryGrid
Power#PowerBudgetOverride
```

FIG. 7C

COMMON ATTRIBUTES 800 FOR
SOFTWARE ARCHITECTURES

ComputerName
Credential
EnableLiveMigration
SecurityFile
TCPPort
VMHostGroup
VMMServer
VMPaths
LogicalNetwork
VMHostProfile

FIG. 8A

ARCHITECTURE-SPECIFIC ATTRIBUTES 840
FOR HYPERV ARCHITECTURE

AvailableForPlacement
BaseDiskPaths
CPUPercentageReserve
Certificate
Description
DiskSpaceReserveMB
EnableSecureMode
EncryptionKey
IsDedicatedToNetworkVirtualizationGateway
...
LiveMigrationMaximum

FIG. 8B

ARCHITECTURE-SPECIFIC ATTRIBUTES 880
FOR VMWARE ARCHITECTURE

DisableCryptoSafe
VMSwapfilePolicy
LicenseKey
TimeoutSeconds
TimeZone
NoRecursion
State
Tag
ResourcePool
RelatedObject
Destination
Evacuate
Location
Password

FIG. 8C

EQUIVALENT ATTRIBUTES 1040 AND CONTROL POINTS 1050

Attribute Format:
Attribute Name (Location(s) in Infrastructure Stack)
  Order of Preference of Attribute Control Points
  Attribute Locations and Possible Operations SSH.1#Enable (Locations: CMC, iDRAC)
  Order of Preference: 1. CMC, 2. DRAC
  Actual Location/Operations: (CMC = Modify), (iDRAC = Modify)

EnableLiveMigration (Locations: Cluster, Host)
  Order of Preference: 1. Cluster, 2. Host
  Actual Location/Operations: (Host = Modify, Create), (Cluster = Create)

Number of Processor Cores (Locations: BIOS, Host)
  Order of Preference: 1. BIOS
  Actual Location/Operations : (BIOS= Modify)

FIG. 10B

GENERATING MULTI-LAYER CONFIGURATION TEMPLATES FOR DEPLOYMENT ACROSS MULTIPLE INFRASTRUCTURE STACK LAYERS

FIELD

The field relates generally to information processing systems, and more particularly to techniques for configuring such information processing systems.

BACKGROUND

Infrastructure stacks, sometimes referred to as "full stacks," are often deployed in computing environments. An infrastructure stack comprises multiple layers of infrastructure elements, such as software elements, hardware elements and clusters of hardware elements, and often employs one or more management consoles for managing the infrastructure elements. For example, the infrastructure elements in an infrastructure stack may comprise software-defined storage elements, hyperconverged infrastructure, and various types of clusters. The management consoles allow multiple instances of a given infrastructure stack to be deployed and managed. Such infrastructure stacks can be problematic, particularly with regard to the difficulty in configuring the infrastructure elements across the multiple layers of an infrastructure stack.

SUMMARY

In one embodiment, a method comprises obtaining a plurality of attribute registries, wherein each attribute registry is associated with at least one component in a given stack layer of a plurality of stack layers of at least one infrastructure stack; evaluating a semantic equivalence of a plurality of attributes in the plurality of attribute registries to identify one or more common attributes that appear in the plurality of stack layers of the at least one infrastructure stack; identifying one or more architecture-specific attributes that appear in the plurality of attributes, wherein the one or more architecture-specific attributes are distinct from the one or more common attributes; obtaining at least one semantic attribute group comprising two or more related attributes of the plurality of attributes in the plurality of attribute registries; determining a semantic attribute group configuration for the two or more related attributes of the at least one semantic attribute group by evaluating a configuration of the two or more related attributes identified in one or more of a deployment configuration comprising the two or more related attributes and a reference template configuration comprising the two or more related attributes; and generating a configuration template for configuring a plurality of server devices, wherein the configuration template comprises (i) a first portion that configures one or more of the common attributes using a configuration of the one or more common attributes in the reference template configuration for at least two of the stack layers of the plurality of stack layers, and (ii) a plurality of second portions, wherein each second portion comprises an architecture-specific configuration, based at least in part on the semantic attribute group configuration, of one or more of the architecture-specific attributes for a corresponding architecture-specific infrastructure stack type of a plurality of architecture-specific infrastructure stack types.

In some embodiments, the method further comprises identifying at least one control point location in a particular stack layer of the plurality of stack layers where a given common attribute can be modified and configuring the given common attribute in the particular stack layer. The given common attribute can be modified at a control point location in multiple stack layers of the plurality of stack layers and the plurality of the control point locations can be prioritized based at least in part on a hierarchy of the plurality of stack layers.

In one or more embodiments, at least one of the plurality of server devices can be associated with a given architecture-specific infrastructure stack type and the configuration template applied to the at least one of the plurality of server devices may comprise the second portion corresponding to the given architecture-specific infrastructure stack type.

Other illustrative embodiments include, without limitation, apparatus, systems, methods and computer program products comprising processor-readable storage media.

BRIEF DESCRIPTION OF THE DRAWINGS

FIG. 6 illustrates an exemplary process for generating multi-layer configuration templates in accordance with one embodiment;

FIGS. 7B and 7C illustrate common attributes across the two different exemplary infrastructure stacks of FIG. 7A and architecture-specific attributes of one of the exemplary infrastructure stacks of FIG. 7A, respectively, in accordance with an illustrative embodiment;

FIG. 8A illustrates common attributes for at least two different software architectures in accordance with an illustrative embodiment;

FIGS. 8B and 8C illustrate architecture-specific attributes of the two different software architectures of FIG. 8A in accordance with an illustrative embodiment;

FIG. 10B illustrates an exemplary data record generated by the exemplary process of FIG. 10A in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for generating multi-layer configuration templates for deployment across multiple infrastructure stack layers.

Figure 1:
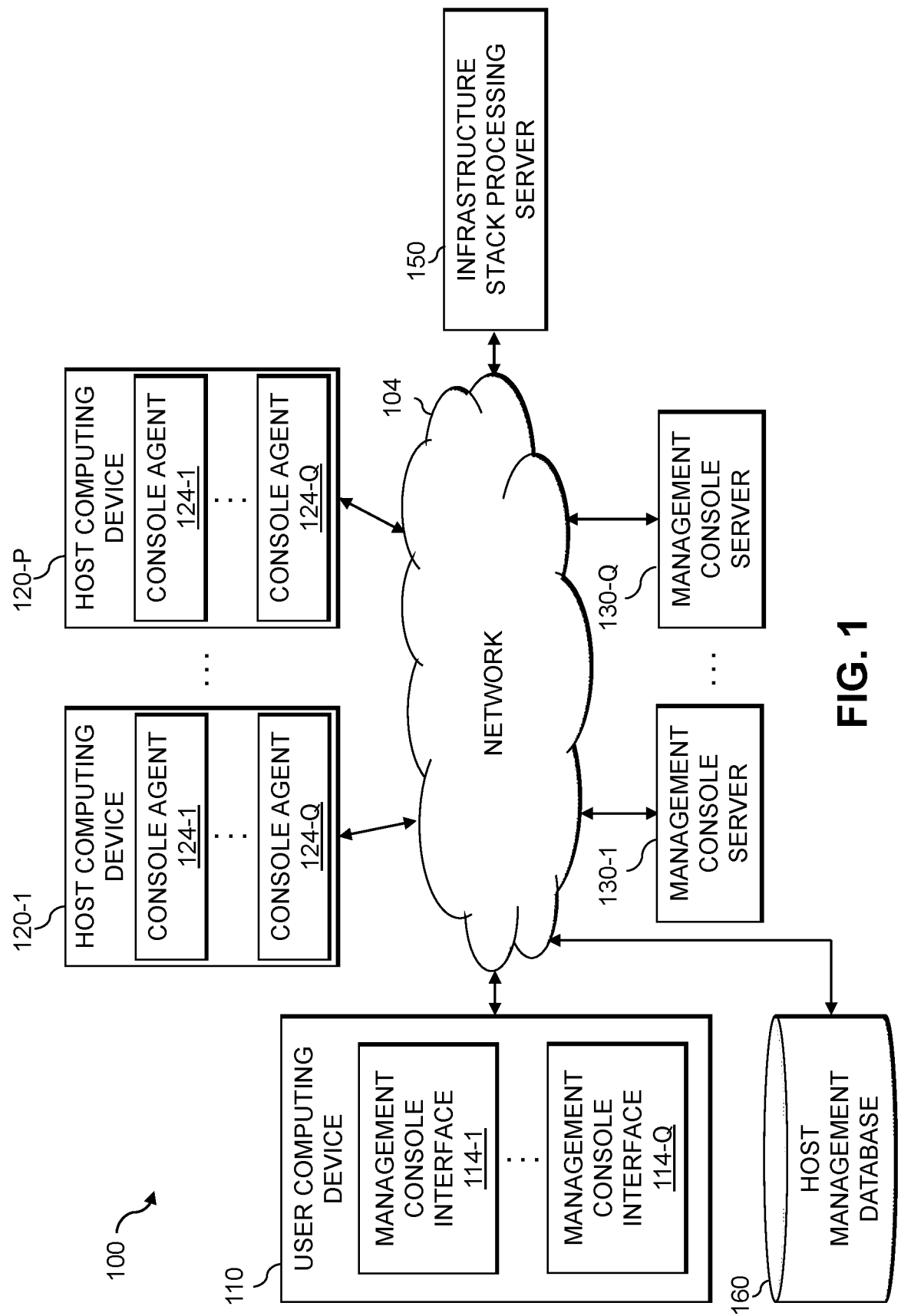
FIG. 1 illustrates an information processing system configured for generating multi-layer configuration templates for deployment across multiple infrastructure stack layers in accordance with an illustrative embodiment.

FIG. 1 shows a computer network (also referred to herein as an information processing system) 100 configured in accordance with an illustrative embodiment. The computer network 100 comprises one or more user computing devices 110, a plurality of host computing devices 120-1 through 120-P, collectively referred to herein as host computing devices 120, a plurality of management console servers 130-1 through 130-Q, collectively referred to herein as management console servers 130, and one or more infrastructure stack processing servers 150. The user computing device 110, host computing devices 120, management console servers 130 and infrastructure stack processing server 150 are coupled to a network 104 in the example of FIG. 1, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The one or more user computing devices 110 may each be associated with, for example, an IT administrator, and may comprise, for example, devices such as mobile telephones, laptop computers, tablet computers, desktop computers or other types of computing devices (e.g., virtual reality (VR) devices or augmented reality (AR) devices). Some of these processing devices are also generally referred to herein as "computers." The user computing devices 110 may comprise a network client that includes networking capabilities such as ethernet, Wi-Fi, etc.

In the example of FIG. 1, the exemplary user computing device 110 comprises one or more management console user interfaces (UIs) 114-1 through 114-Q to interact with one or more of the management console servers 130, as discussed further below. It is noted that, in some embodiments, a given user computing device 110 may not require a management console UI 114 for each of the available management console servers 130. A representative management console server 130 is discussed further below in conjunction with FIG. 4. The one or more infrastructure stack processing servers 150 are discussed further below in conjunction with FIG. 5.

It is to be appreciated that the term "user" as used herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The host computing devices 120 may comprise, for example, server devices or other types of computers of an enterprise computer system, cloud-based computer system or other arrangement of multiple compute nodes associated with respective users. Such devices are examples of what are more generally referred to herein as "processing devices." Some of these processing devices are also generally referred to herein as "computers." The host computing devices 120 may comprise a network client that includes networking capabilities such as ethernet, Wi-Fi, etc.

For example, the host computing devices 120 in some embodiments illustratively provide compute services such as execution of one or more applications on behalf of each of one or more users associated with respective ones of the user computing devices 110. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The host computing devices 120 in some embodiments may comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

In the example of FIG. 1, the exemplary host computing devices 120 comprise one or more console agents 124-1 through 124-Q to interact with one or more of the management console servers 130. An exemplary implementation of a representative host computing device 120 is discussed further below in conjunction with FIG. 3. It is noted that, in some embodiments, a given host computing device 120 may not require a console agent 124 for each of the available management console servers 130.

One or more of the user computing devices 110, host computing devices 120, management console servers 130, and/or infrastructure stack processing servers 150 illustratively comprise processing devices of one or more processing platforms. For example, a representative infrastructure stack processing server 150 can comprise one or more processing devices each having a processor, a memory and a network interface, possibly implementing virtual machines and/or containers, although numerous other configurations are possible. The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements. The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more of the user computing devices 110, host computing devices 120, management console servers 130, and/or infrastructure stack processing servers 150 can additionally or alternatively be part of edge infrastructure and/or cloud infrastructure such as an Amazon Web Services (AWS) system. Other examples of cloud-based systems that can be used to provide at least portions of the user computing devices 110, host computing devices 120, management console servers 130, and/or infrastructure stack processing servers 150 include Dell Cloud, Google Cloud Platform (GCP) and Microsoft Azure.

Additionally, one or more of the user computing devices 110, the host computing devices 120, the management console servers 130 and/or the infrastructure stack processing server 150 can have one or more associated host management databases 160. Although the management information is stored in the example of FIG. 1 in a single host management database 160, in other embodiments, an additional or alternative instance of the host management database 160, or portions thereof, may be incorporated into portions of the system 100.

The one or more host management databases 160 may be configured to store, for example, update baselines, vulnerability catalogs, update catalogs, attribute registries and/or workflow databases, portions thereof and/or multiple instances of any of the foregoing, as discussed further below. The host management database 160 may be accessed, for example, in connection with managing one or more of the host computing devices 120.

The one or more host management databases 160 can be implemented using one or more storage systems associated with the respective devices 110, 120, 130 and/or 150. Such storage systems can comprise any of a variety of different types of storage including such as network-attached storage (NAS), storage area networks (SANs), direct-attached storage (DAS) and distributed DAS, as well as combinations of these and other storage types, including software-defined storage.

The storage devices in such storage systems illustratively comprise solid state drives (SSDs). Such SSDs are implemented using NVM devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

One or more of the user computing devices 110, host computing devices 120, management console servers 130 and/or infrastructure stack processing server 150 may be implemented on a common processing platform, or on separate processing platforms. The host computing devices 120 are illustratively configured to write data to and read data to/from a storage system in accordance with applications executing on those host devices for system users. One or more of the user computing devices 110, host computing devices 120, management console servers 130 and/or infrastructure stack processing server 150 may be implemented, for example, on the cloud or on the premises of an enterprise or another entity.

The host computing devices 120 are configured to interact over the network 104, for example, with one or more of the management console servers 130 and/or storage devices. Such interaction illustratively includes generating IO operations, such as write and read requests, and sending such requests over the network 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host computing devices 120 and a storage system to reside in different data centers. Numerous other distributed implementations of the host devices and storage systems are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the user computing devices 110, the host computing devices 120, the management console servers 130 and/or the infrastructure stack processing server 150 can be one or more input-output devices (not shown), which illustratively comprise keyboards, displays or other types of input-output devices in any combination. Such input-output devices can be used, for example, to support one or more user interfaces to such devices 110, 120, 130 and/or 150, as well as to support communication between such devices 110, 120, 130 and/or 150 and other related systems and devices not explicitly shown.

It is to be appreciated that this particular arrangement of elements in the user computing devices 110, the host computing devices 120 and/or the management console servers 130 of the FIG. 1 embodiment is presented by way of example only, and alternative arrangements can be used in other embodiments. For example, the functionality associated with at least some of the management console UIs 114-1 through 114-Q and/or console agents 124-1 through 124-Q in other embodiments can be implemented as a single element or device; separated across a larger number of elements; and/or implemented using multiple distinct processors. At least portions of such elements may be implemented at least in part in the form of software that is stored in memory and executed by a processor.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

It is to be understood that the particular set of elements shown in FIG. 1 for generating multi-layer configuration templates for deployment across multiple infrastructure stack layers is presented by way of illustrative example only, and in other embodiments additional or alternative elements may be used. Thus, another embodiment includes additional or alternative systems, devices and other network entities, as well as different arrangements of modules and other components.

Figure 2:
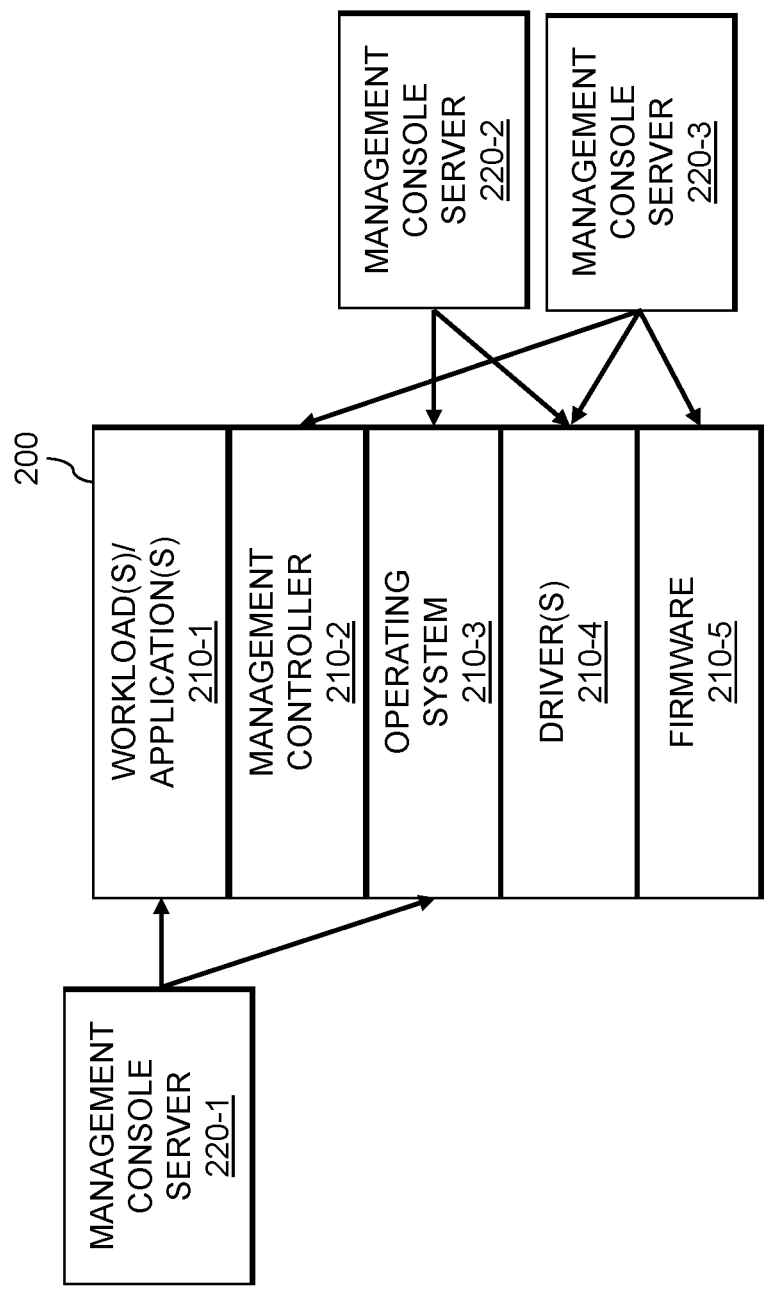
FIG. 2 illustrates an exemplary infrastructure stack related to the information processing system of FIG. 1 in accordance with an illustrative embodiment.

FIG. 2 illustrates an exemplary infrastructure stack 200 related to the information processing system of FIG. 1 in accordance with an illustrative embodiment. In the example of FIG. 2, the infrastructure stack 200 comprises a plurality of stack layers 210-1 through 210-5, such as a workloads or applications layer 210-1; a management controller layer 210-2, an operating system layer 210-3; a driver layer 210-4; and a firmware layer 210-5. The exemplary infrastructure stack 200 is managed by a plurality of management console servers 220-1 through 220-3. Each management console server 220 manages one or more layers of the infrastructure stack 200. In addition, in some embodiments, multiple management console servers 220 may manage at least some of the infrastructure elements in the same layer 210. In the example of FIG. 2, the management console server 220-1 and the management console server 220-2 both manage at least some of the infrastructure elements in the operating system layer 210-3 (potentially causing one or more inconsistencies).

In at least some embodiments, each layer 210 of the infrastructure stack 200 may have different attribute registries than other layers 210, and each layer 210 may have a different attribute registry for each technology variation (for example, a corresponding attribute registry may be provided by the provider of a given technology on each layer 210).

For example, an OpenManage Enterprise (OME) management console may employ configurations (e.g., for firmware, drivers and the management controller in layers 210-5, 210-4 and 210-2, respectively) that are created using various catalogs or other configuration information. In addition, an SCVMM (System Center Virtual Machine Manager) management console may employ configurations, e.g., for drivers and an operating system in layers 210-4 and 210-3, respectively. Further, an MECM (Microsoft Endpoint Configuration Manager) console may employ configurations, e.g., for drivers and an operating system in layers 210-4 and 210-3, respectively.

Figure 3:
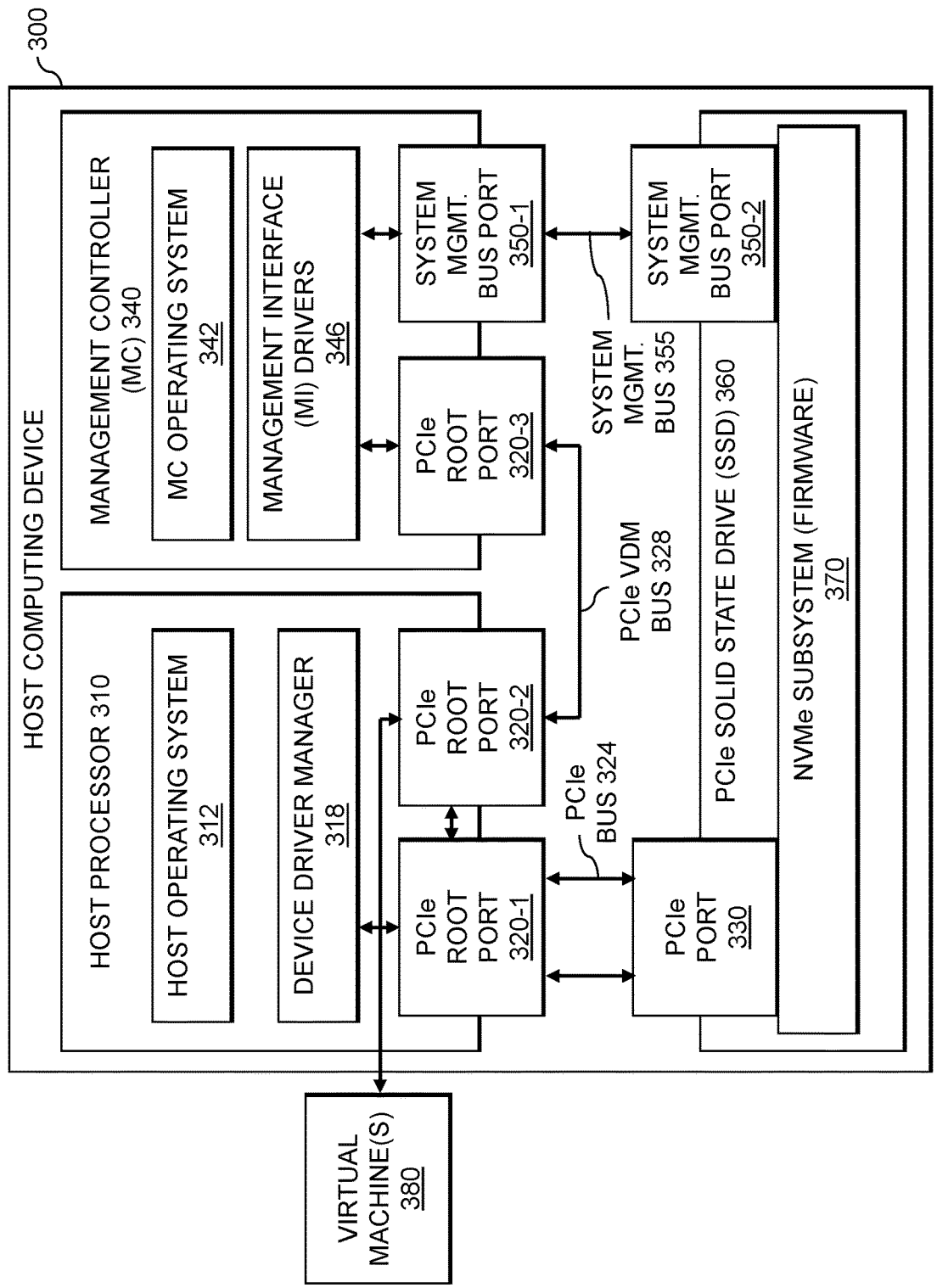
FIG. 3 illustrates an exemplary host computing device of FIG. 1 in further detail in accordance with an illustrative embodiment.

FIG. 3 illustrates an exemplary host computing device 300 in accordance with an illustrative embodiment. In the example of FIG. 3, the exemplary host computing device 300 comprises a host processor 310, a management controller (MC) 340 and a PCIe (Peripheral Component Interconnect Express) SSD 360. The exemplary host processor 310 comprises a host operating system 312 and a device driver manager 318 that comprises and manages one or more device drivers, such as an NVMe device driver (not specifically shown in FIG. 2). Such drivers may be configured, secured and/or updated in accordance with some embodiments of the disclosure, as discussed further below.

In addition, the host processor 310 comprises two PCIe root ports 320-1 and 320-2 for communicating with a PCIe port 330 of the PCIe SSD 360 and a PCIe root port 320-3 of the management controller 340, respectively. The PCIe root port 320-1 communicates with the PCIe port 330 of the PCIe SSD 360 using a PCIe bus 324. The PCIe root port 320-2 communicates with the PCIe root port 320-3 of the management controller 340 using a PCIe VDM (Vendor Defined Message) bus 328 that channelizes the information to the management controller 340.

In one or more embodiments, the exemplary management controller 340 further comprises an MC operating system 342 and one or more management interface (MI) drivers 346, such as an NVMe-MI driver (not specifically shown in FIG. 3). The management interface drivers 346 each comprise a command set and architecture for managing respective firmware, such as NVMe firmware, to discover, monitor, configure, and update firmware in multiple operating environments.

The exemplary management controller 340 also comprises a system management bus port 350-1 that communicates with a system management bus port 350-2 of the PCIe SSD 360 using a system management bus 355 based on a serial communication protocol. The management controller 340 may be implemented, for example, as a baseboard management controller (BMC), such as the Integrated Dell Remote Access Controller (iDRAC), commercially available from Dell Technologies, or another out of band (OOB) controller.

In some embodiments, the exemplary host computing device 300 hosts one or more virtual machines 380 that communicate with at least portions of the exemplary host computing device 300 using the PCIe root port 320-2. For example, a given virtual machine 380 may directly request the management controller 340 (such as a BMC or an iDRAC) to update firmware (potentially bypassing the host operating system 312 and/or the drivers using a passthrough channel).

The exemplary PCIe SSD 360 is one example of a component of the exemplary host computing device 300 comprising firmware. As shown in the example of FIG. 3, the PCIe SSD 360 further comprises an NVMe subsystem 370 as an example of firmware that may be configured, secured and/or updated in accordance with some embodiments of the disclosure, as discussed further below.

Figure 4:
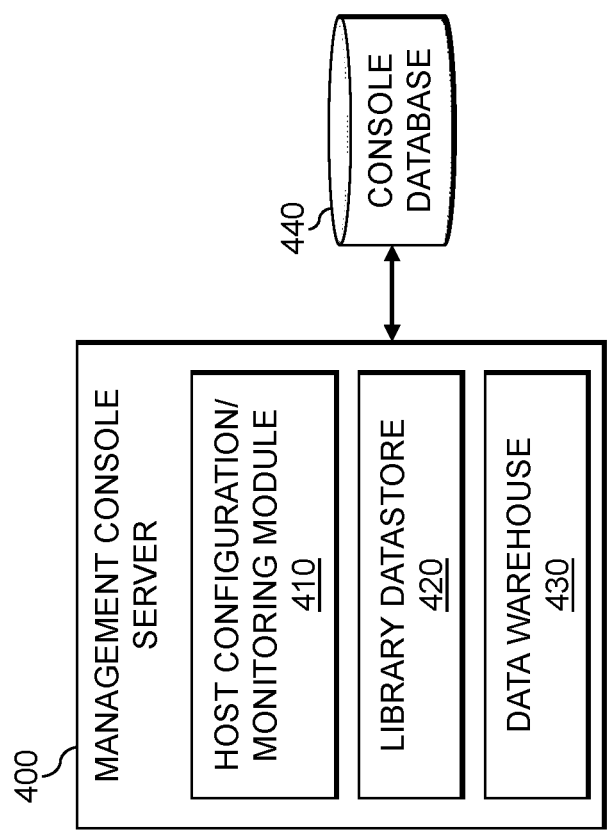
FIG. 4 illustrates an exemplary management console server of FIG. 1 in further detail in accordance with an illustrative embodiment.

FIG. 4 illustrates an exemplary management console server 400 in further detail in accordance with an illustrative embodiment. In the example of FIG. 4, the management console server 400 comprises a host configuration/monitoring module 410, a library datastore 420, and a data warehouse 430. A given management console server 400 may span (e.g., control) multiple clusters of the host computing devices 120 of FIG. 1.

The host configuration/monitoring module 410, in one or more embodiments, is configured to perform one or more functions for configuring, updating and/or monitoring one or more of the host computing devices 120 or other devices in the system 100 of FIG. 1. One or more of the management console servers 400 may be implemented in some embodiments, using an OpenManage Enterprise (OME) console, an SCVMM (System Center Virtual Machine Manager) console and/or an MECM (Microsoft Endpoint Configuration Manager) console.

In at least some embodiments, the management console server 400 can have one or more associated console databases 440 configured to store console data, such as information related to devices, update baselines, monitoring data (e.g., alerts and/or health status), and configuration data (e.g., configuration data related to clusters). Although the console information is stored in the example of FIG. 4 in a single console database 440, in other embodiments, an additional or alternative instance of the console database 440, or portions thereof, may be incorporated into portions of the system 100 of FIG. 1.

The library datastore 420 is configured in some embodiments to store, for example, operating system images, applications, patches and driver versions.

The data warehouse 430 is configured in some embodiments to store, for example, data from the console database 440 that has been pushed to the data warehouse 430, for example, for reporting purposes.

Operational Templates (for example, in OpenManage Integrations) provide a mechanism to create a "golden" or "reference" infrastructure configuration (e.g., comprising a desired configuration state) that meets certain deployment goals. IT architects can create these templates that are used by several IT administrators to deploy multiple environments that have similar requirements. IT administrators may also track changes of the deployments with respect to these templates through drift and can take remediation actions that fix the deployments to a desired configuration state.

One or more aspects of the disclosure recognize that hardware and software stacks are getting increasingly complex. For example, customers may deploy servers in a rack/tower configuration, a modular configuration, or a disaggregated configuration, with different infrastructure stacks, such as VMware, Microsoft, RedHat and SuSE. A modular configuration typically comprises multiple blade servers that share power supplies, cooling and other resources. Each blade server typically has its own BMC (Baseboard Management Controller) and acts like one rack server in a rack/tower configuration.

Different technologies are often employed to capture the benefits and quality of the solutions that each technology offers. For example, modular systems offer high availability (e.g., due to the ability to replace blade servers) and with beneficial power usage and form factor; while rack servers offer ease of deployment and beneficial usage costs per compute.

Typically, the goal of a customer is to deploy a traditional server, compute cluster, scale out fileserver cluster, hyper-converged infrastructure (HCI), HPC (High Performance Computing) cluster or a hybrid cluster. Thus, vendors and customers usually create different sets of templates across different hardware and software stacks (sometimes, multiple templates are needed at different levels to provide these technologies). Thus, IT administrators may need to create different templates across different hardware architectures and different infrastructure stack environments.

Attribute Registries comprise data dictionary tables with attribute definitions that can be used to configure an entity. Attribute definitions typically comprise attribute names, descriptions, type, ranges and/or patterns of acceptable values, units and other aspects of the attributes.

A number of consoles (such as an iDRAC Console or an OpenManage Enterprise-Modular (OME-M) console) currently export a configuration in an XML/JSON format, for example, through a REST application programming interface (API). The exported configuration is referred to as a system configuration profile. In the case of an iDRAC (or another BMC), the exported configuration covers the server/blade configuration. In the case of a chassis, the exported configuration covers the common shared components in a modular system (e.g., fans and power devices). The REST API provides import and export operations. Within each import and export operation, there are modifications of operation—"Apply", "Clone", and "Preview", and the scope of the operation (e.g., the components that the operation should be applied to).

During an import operation, an orchestration mechanism splices the XML/JSON file and dispatches the components of the XML to the corresponding components within the server or modular system. Each system performs the corresponding operation and reports back the result. During an export operation, the orchestration mechanism collects the XML/JSON nuggets from the desired components and reports back.

Components can be existing components (e.g., NIC ports, iDRAC, BIOS, Controllers) or can be created components (e.g., virtual disks). For creatable components, create and delete operations are made possible through a special attribute "Operation" (which is given the value Create/Modify/Delete). Based on the operation type, the orchestration mechanism needs appropriate values. Modify operations are allowed for those attributes that can be altered. Fetch/View operations are allowed for all attributes.

Operational Templates (e.g., in OpenManage Microsoft Integrations) extend these features to add soft components (e.g., operating system and console) and soft registries (e.g., Linux and console).

The above-described technologies, allow the configuration for the server/chassis to be completely performed. Different templates, however, are needed for different hardware technologies (e.g., chassis/blade and rack) and across various software technologies (such as VMware and hype-v). Thus, the number of templates quickly becomes large and unwieldy.

Figure 5:
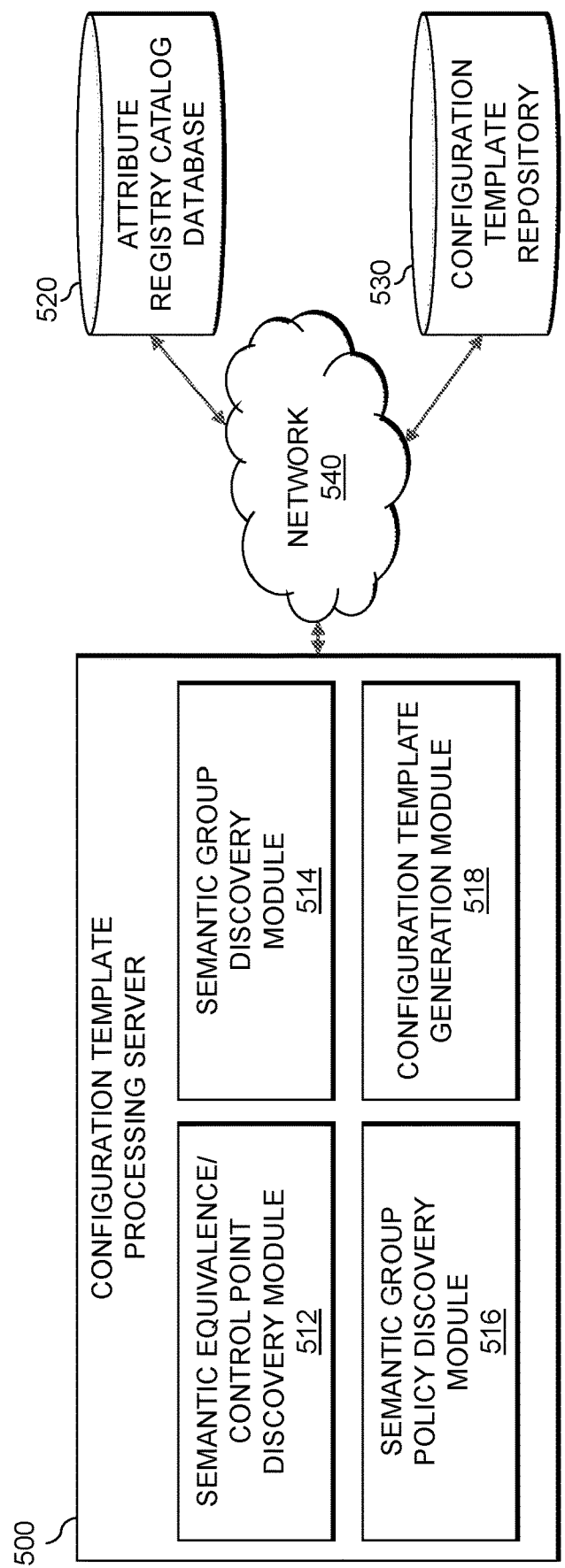
FIG. 5 illustrates an exemplary implementation of the infrastructure stack processing server of FIG. 1 as a configuration template processing server, in accordance with one embodiment.

FIG. 5 illustrates an exemplary implementation of the infrastructure stack processing server 150 of FIG. 1 as a configuration template processing server 500, in accordance with one embodiment. The example of FIG. 5, the configuration template processing server 500 comprises a semantic equivalence/control point discovery module 512, a semantic group discovery module 514, a semantic group policy discovery module 516 and a configuration template generation module 518, as discussed further below in conjunction with FIGS. 6, 10A, 11A, 12A and 13.

In some embodiments, the configuration template processing server 500 accesses an attribute registry catalog database 520 and/or configuration template repository 530 over a network 540. The attribute registry catalog database 520 may be configured to store one or more attribute registry catalogs associated with various stack elements. The configuration template repository 530 is configured to store one or more configuration templates generated using the disclosed generating multi-layer configuration template generation techniques and to deploy such configuration templates across multiple infrastructure stack layers.

Although the attribute registry information is stored in the example of FIG. 5 in a single attribute registry catalog database 520, and the configuration information is stored in the example of FIG. 5 in a single configuration template repository 530, in other embodiments, an additional or alternative instance of the attribute registry catalog database 520 and/or the configuration template repository 530, or portions thereof, may be incorporated into portions of the system 100.

It is to be appreciated that this particular arrangement of elements 512, 514, 516, 518 illustrated in the configuration template processing server 500 of FIG. 5 is presented by way of example only, and alternative arrangements can be used in other embodiments. For example, the functionality associated with elements 512, 514, 516, 518 in other embodiments can be implemented as a single element or device, or separated across a larger number of elements. As another example, multiple distinct processors can be used to implement different ones of elements 512, 514, 516, 518, or portions thereof.

At least portions of elements 512, 514, 516, 518 may be implemented at least in part in the form of software that is stored in memory and executed by a processor. An exemplary process utilizing elements 512, 514, 516, 518 of the configuration template processing server 500 of FIG. 5 will be described in more detail with reference to, for example, FIGS. 6, 10A, 11A, 12A and 13.

FIG. 6 illustrates an exemplary process 600 for generating multi-layer configuration templates in accordance with one embodiment. In some embodiments of the process 600, multi-layer configuration templates are generated by capturing a configuration from an existing deployment, such as a cluster or a golden configuration. Typically, customers use similar patterns in attributes for certain architectures and workloads. For example, ESXi is typically installed in flash and IDSDM (Internal Dual SD module) modules. In addition, Windows OS typically has two drives for operating system and data), or can be driven by organization policies (such as security behaviors). The multi-layer configuration template creation process learns these patterns to understand how IT administrators configure architecture-specific environments.

Architecture-agnostic attributes (e.g., common attributes) are separated out from architecture-specific attributes, as discussed further below. Architecture-agnostic attributes form the core multi-layer configuration, while architecture-specific attributes from the golden configuration provide reference for that architecture. The best architecture-specific attributes can be proposed for alternate possible architectures (e.g., leveraging group attribute learning).

In the example of FIG. 6, the process 600 processes attribute registries and infrastructure stack configuration files (e.g., in a JSON format), as follows:
a. create attribute registries at multiple levels;
b. find semantic equivalence of attributes at each layer to identify common attributes, and the control point where each common attribute can be modified (as discussed further below in conjunction with FIG. 10A);
c. perform semantic attribute group discovery to group together related attributes (as discussed further below in conjunction with FIG. 11A);
d. perform semantic group policy discovery to obtain configuration of semantic attribute groups (as discussed further below in conjunction with FIG. 12A);
e. perform configuration template creation (as discussed further below in conjunction with FIG. 13), as follows:
   i. separate common portions and architecture-specific portions;
   ii. common portions form first portion of configuration template; and
   iii. propose semantic group policies for architecture-specific configuration portions of configuration template.

Figure 7A:
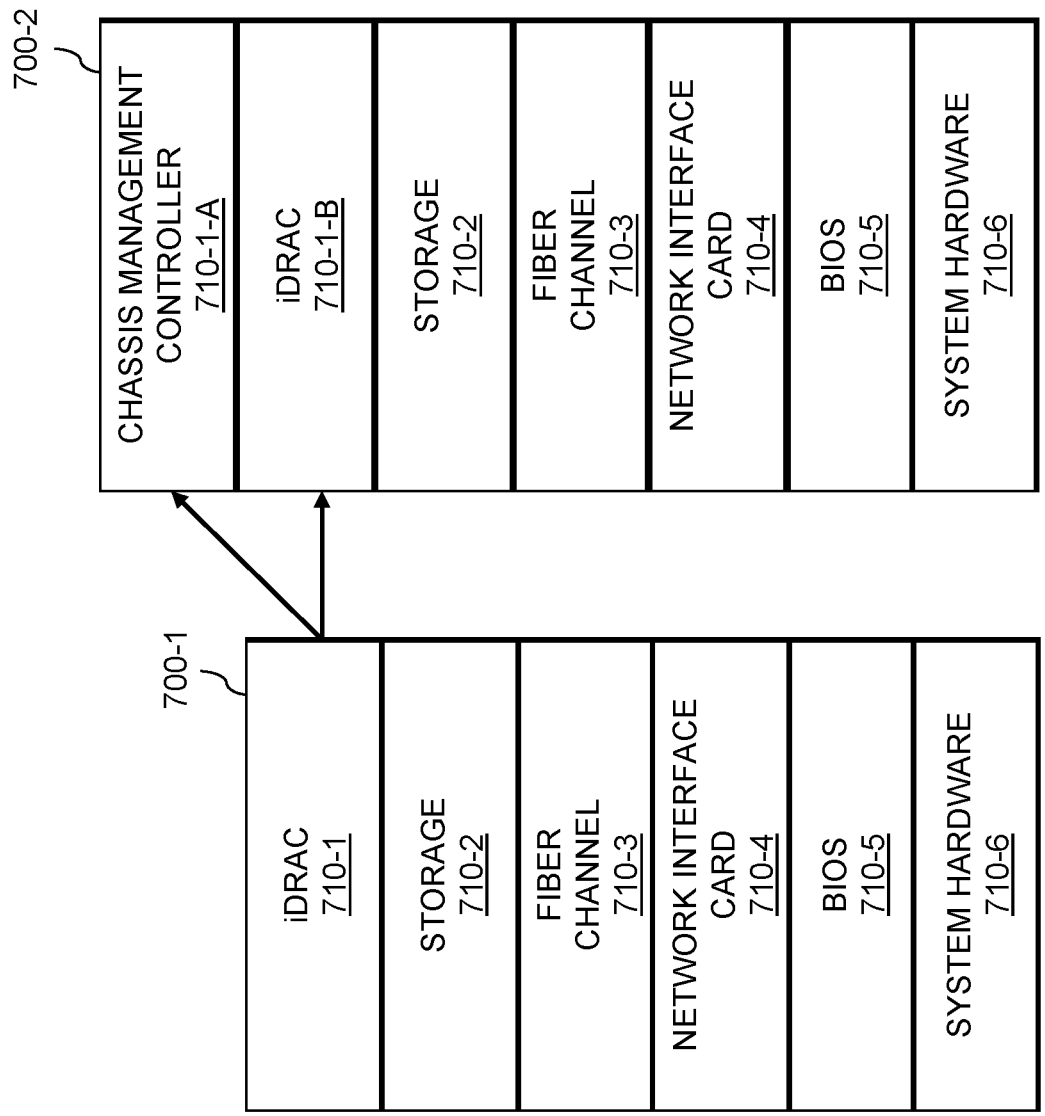
FIG. 7A illustrates two different exemplary infrastructure stacks related to the information processing system of FIG. 1 in accordance with an illustrative embodiment.

FIG. 7A illustrates two different exemplary infrastructure stacks 700-1, 700-2 related to the information processing system of FIG. 1 in accordance with an illustrative embodiment. FIG. 7A illustrates the separation of architecture-agnostic attributes from architecture-specific attributes for hardware configuration elements associated with two server configuration technologies. In the example of FIG. 7A, a first infrastructure stack 700-1 is shown for a rack/tower server configuration and a second infrastructure stack 700-2 is shown for a modular system. As noted above, a modular system configuration typically comprises multiple blade servers that share power supplies, cooling and other resources. Each blade server typically has its own BMC (such as an iDRAC) and acts like one rack server in a rack/tower configuration.

The two exemplary infrastructure stacks 700 each comprise a storage layer 710-2, a fiber channel layer 710-3, a network interface card layer 710-4, a BIOS layer 710-5, and a system hardware 710-6. In addition, the iDRAC attributes in the iDRAC layer 710-1 of the rack/tower configuration associated with the first infrastructure stack 700-1 are split into both a Chassis Management Controller (CMC) 710-1-A (or an OME-M controller) and a blade iDRAC 710-1-B in the modular configuration of the second infrastructure stack 700-2. The attributes in the CMC 710-1-A are log configuration, power supply unit configuration, alert destinations, time server configuration, quick sync, session configurations and security configurations (e.g., for the shared resources of the modular system). These attributes are configured in the iDRAC layer 710-1 of the rack/tower models.

FIGS. 7B and 7C illustrate common attributes 740 across the two different exemplary infrastructure stacks 700-1 and 700-2 of FIG. 7A and architecture-specific attributes 750 of the second infrastructure stack 700-2 of FIG. 7A, respectively, in accordance with an illustrative embodiment. As shown in FIG. 7B, a number of common attributes 740 for hardware configuration elements are common for the blade/chassis and rack/tower models associated with the two different exemplary infrastructure stacks 700-1 and 700-2 of FIG. 7A.

FIG. 7C illustrates a number of architecture-specific attributes 750 that are unique to the blade/chassis configuration associated with the second infrastructure stack 700-2 of FIG. 7A (e.g., related to the shared resources of the modular system).

FIGS. 8A through 8C separates architecture-agnostic attributes from architecture-specific attributes for software configuration elements associated with two software technologies (such as, VMware and hype-v virtualization controllers), according to an embodiment. In the case of a software stack, each layer has common and specific attributes across at least two different software technologies. The user can specify either of the common or specific attributes. The generated configuration JSON file should contain both the common and specific attributes, in at least some embodiments, so that it can be applied to any configuration.

FIG. 8A illustrates a number of common attributes 800 for the two different software architectures (e.g., for the VMware virtualization controller and the hype-v virtualization controller) in accordance with an illustrative embodiment. FIG. 8B illustrates a number of architecture-specific attributes 840 that are unique to the hype-v virtualization controller. FIG. 8C illustrates a number of architecture-specific attributes 880 that are unique to the VMware virtualization controller, accordance with an illustrative embodiment.

Figure 9:
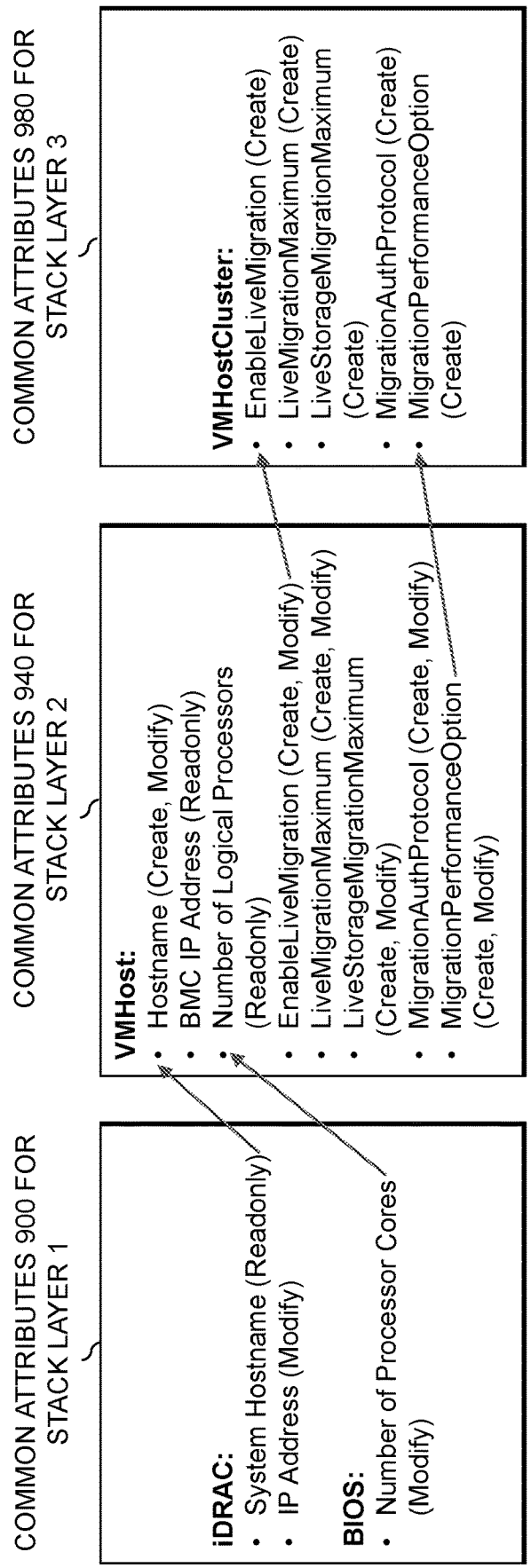
FIG. 9 illustrates an analysis of semantic equivalence of common attributes across multiple layers of an infrastructure stack, according to one embodiment of the disclosure.

FIG. 9 illustrates an analysis of semantic equivalence of common attributes 900, 940 and 980 across three exemplary layers of an infrastructure stack, according to one embodiment of the disclosure. The analysis of FIG. 9 can reveal cross-stack configuration patterns (e.g., across layers of the infrastructure stack), as well as the control point where the attribute can be modified. As noted above, some attributes are common across layers of the infrastructure stack and they can be operating at a certain layer or at multiple layers. For example, a "number of processor cores" property is reported by layers 1 and 2 of the infrastructure stack (such as operating system and BIOS layers in the example of FIG. 9). The analysis of FIG. 9 reconciles such attributes across multiple layers of the infrastructure stack and identifies the locations where the property can be changed (e.g., in the BIOS of layer 1 for the "number of processor cores" attribute). In addition, if a given attribute can be modified in multiple stack layers, then the multiple locations can be prioritized based on the level of the component that can modify the attribute inside the infrastructure stack (e.g., higher stack layers may be given higher priority).

Figure 10A:
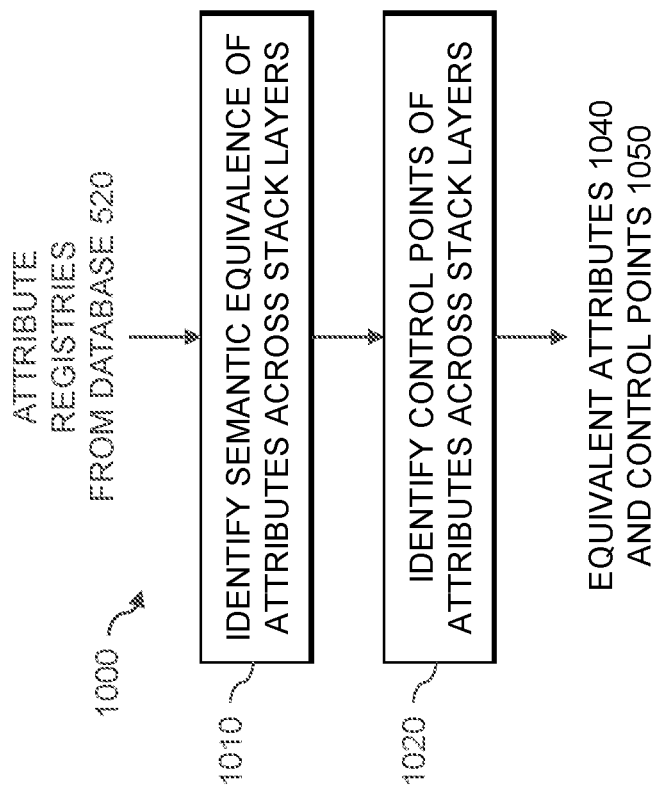
FIG. 10A is a flow chart illustrating an exemplary process for identifying semantic equivalence and control points of attributes in a multi-layer infrastructure stack in accordance with an illustrative embodiment.

FIG. 10A is a flow chart illustrating an exemplary process 1000 for identifying semantically equivalent attributes 1040 and control points 1050 of the semantically equivalent attributes in a multi-layer infrastructure stack in accordance with an illustrative embodiment. In the example of FIG. 10A, the semantic equivalence of attributes at multiple layers and control point discovery uses the multi-layer semantic equivalence analysis of FIG. 9.

As shown in FIG. 10A, the process 1000 initially identifies the semantic equivalence of attributes across the multiple stack layers in step 1010 to generate the semantically equivalent attributes 1040, and identifies the control points 1050 of attributes across stack layers in step 1020.

FIG. 10B illustrates an exemplary data record generated by the exemplary process of FIG. 10A in accordance with an illustrative embodiment. In the example of FIG. 10B, the exemplary data record comprises the semantically equivalent attributes 1040 and the corresponding control points 1050. For each semantically equivalent attribute, the attribute name is provided along with the location(s) in the infrastructure stack where each semantically equivalent attribute appears; an order of preference of attribute control points and attribute locations and possible operations.

Figure 11B:
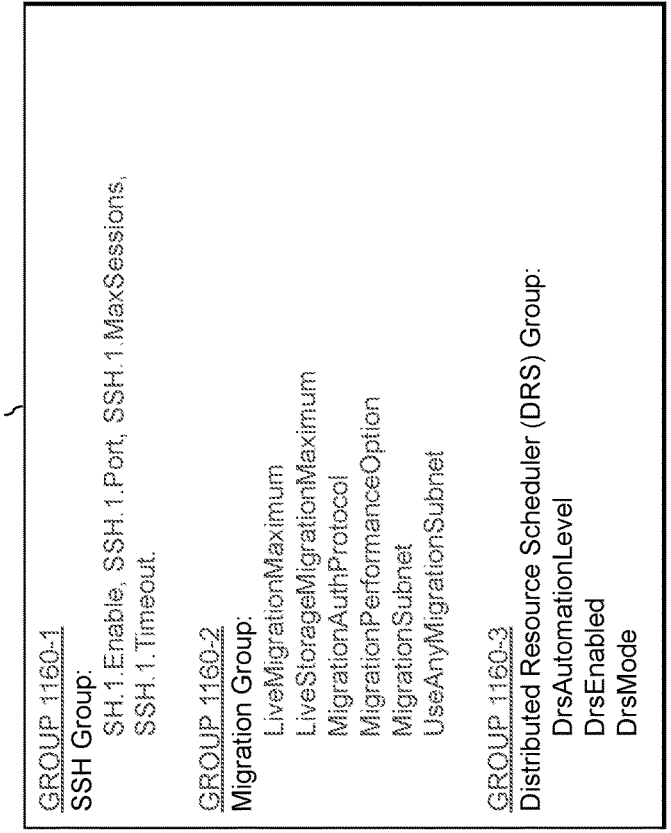
FIG. 11B illustrates an exemplary data record generated by the exemplary process of FIG. 11A in accordance with an illustrative embodiment.
Figure 11A:
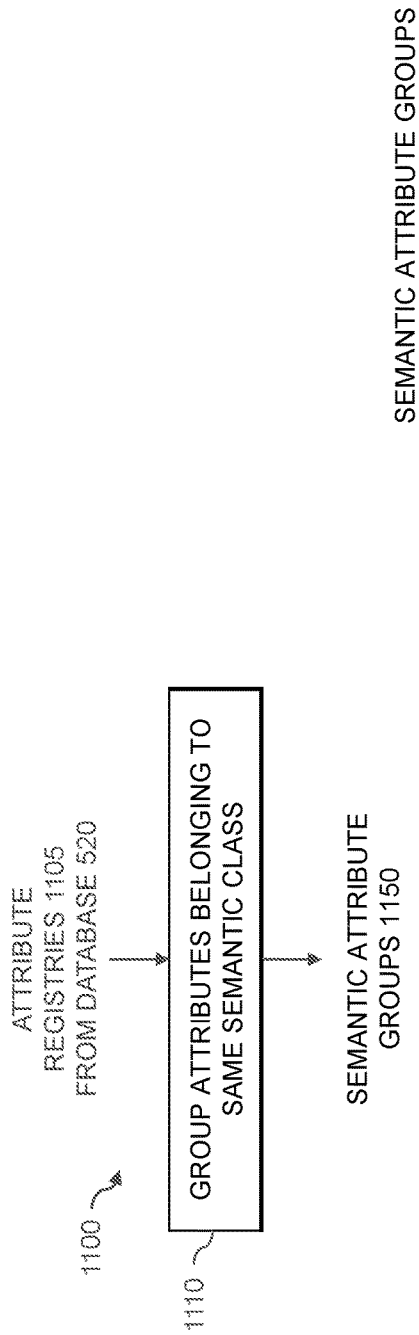
FIG. 11A is a flow chart illustrating an exemplary process for generating semantic attribute groups in accordance with an illustrative embodiment.

FIG. 11A is a flow chart illustrating an exemplary process 1100 for generating semantic attribute groups in accordance with an illustrative embodiment. In some embodiments, the semantic attribute group discovery of FIG. 11A is employed to group attributes related to a given feature together. For example, attributes from one or more attribute registries 1105 (e.g., from the attribute registry catalog database 520) can be identified in step 1110 that belong to a same semantic class. For example, all attributes belonging to a similar feature (e.g., a high availability (HA) feature, a distributed resource scheduler (DRS) feature and/or a migration feature) can be grouped together. The result of the semantic attribute group discovery of FIG. 11A is one or more semantic attribute groups 1150 comprising an intermediate result that is used by the process of FIG. 12A.

FIG. 11B illustrates an exemplary data record of one or more semantic attribute groups 1150 generated by the exemplary process of FIG. 11A in accordance with an illustrative embodiment. In the example of FIG. 11B, semantic attribute groups 1160-1 through 1160-3 are shown. Semantic attribute group 1160-1 comprises an SSH attribute group, semantic attribute group 1160-2 comprises a migration attribute group and semantic attribute group 1160-3 comprises a DRS group.

Figure 12A:
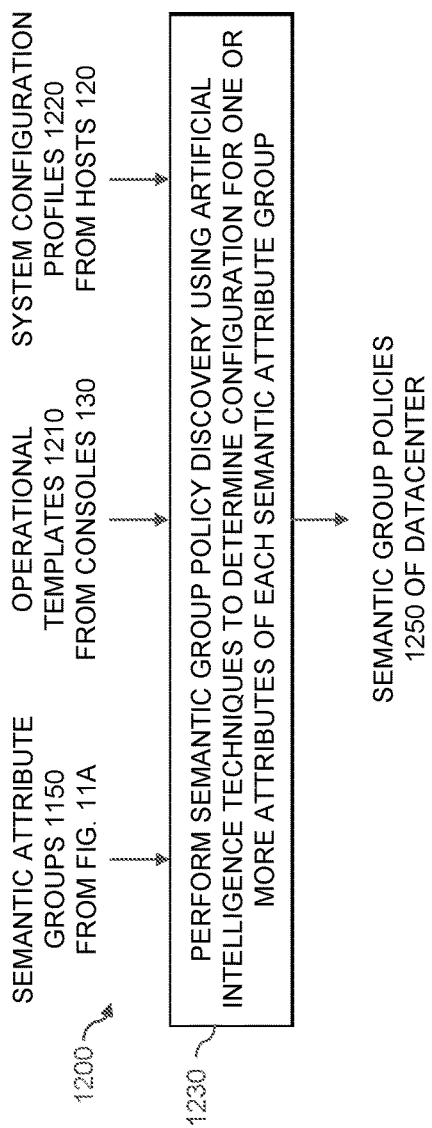
FIG. 12A is a flow chart illustrating an exemplary process for determining a configuration for one or more attributes of each semantic attribute group in accordance with an illustrative embodiment.

FIG. 12A is a flow chart illustrating an exemplary process 1200 for determining a configuration for one or more attributes of each semantic attribute group in accordance with an illustrative embodiment. The exemplary process 1200 learns how IT administrators configure the grouped attributes across different infrastructure stacks (e.g., in their datacenter), according to some embodiments. In the example of FIG. 12A, the semantic group policy discovery process processes the semantic attribute groups 1150 of FIG. 11A, one or more existing operational templates 1210 from one or more management console servers 130 and system configuration profiles 1220 from host computing devices 120. In general, early deployments are closer to the design of the IT architect. If the deployments change over time, some parameter settings in the templates may need to be replaced with new settings.

The exemplary process 1200 performs semantic group policy discovery in step 1230 using artificial intelligence techniques to determine semantic group policies 1250 comprising a configuration for one or more attributes of each semantic attribute group 1150. The applied template and deployment information can be clustered based on the infrastructure stack (e.g., main versions of workload/virtualization/hardware version without patches). Generally, in some embodiments, new versions of software/firmware usually carry new features, and those attributes may not have been configured in prior versions.

In the example of FIG. 12A, the process 1200 first examines the existing operational templates 1210 and makes a list of those attributes that are used by the templates 1210, referred to as the attributes of interest for the administrator (these attributes are architect designed). The process 1200 then examines the system configuration profiles 1220 from the deployments. Attributes with default values may be removed in some embodiments. Patterns of attributes of interest to the administrator (by applying a first collaborative filter to the operational templates 1210) are grouped into a Policy Set and patterns of attributes in the deployments (after pruning the default values) are grouped into an Advanced Set (e.g., by applying a second collaborative filter to the template configurations in the data center over time).

If there are more deployments belonging to the Advanced Set, then the Advanced Set is used for the semantic group policies, in at least some embodiments, otherwise the Policy Set is selected. It is noted that the Advanced Set may be a result of an IT Administrator configuring those attributes arising due to newer firmware; which the older templates did not consider.

It is unlikely that there will be a large number of Policy/Advanced Sets inside a datacenter, as IT Administrators follow well-defined practices for deploying similar workloads and SLA needs.

Figure 12B:
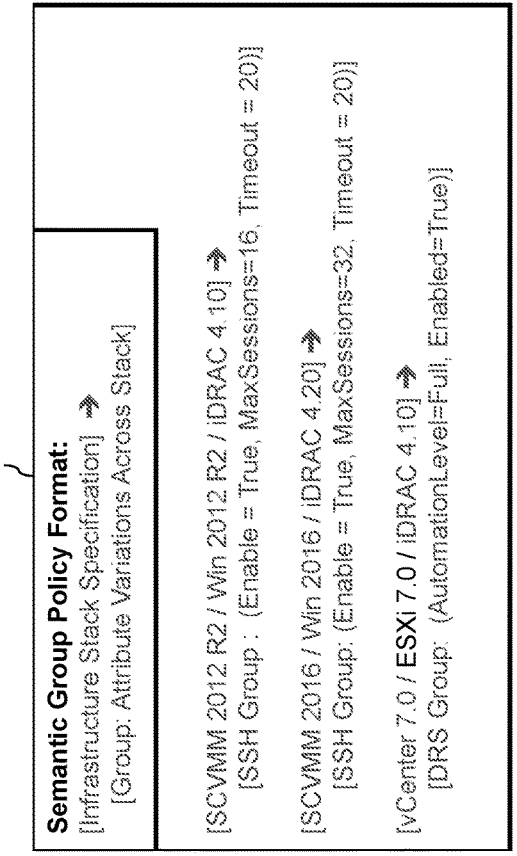
FIG. 12B illustrates an exemplary data record generated by the exemplary process of FIG. 12A in accordance with an illustrative embodiment.

FIG. 12B illustrates an exemplary data record of semantic group policies 1250 generated by the exemplary process of FIG. 12A in accordance with an illustrative embodiment. The exemplary semantic group policies 1250 generated by the example of FIG. 12A are determined for different combinations of console version, Host/OS version and iDRAC version. For each combination of such versions, the indicated corresponding values of each set are used to configure the corresponding stack components. For example, the combination of "SCVMM 2012 R2/Win 2012 R2/iDRAC 4.10" will be configured with values of "SSH: (Enable=True, MaxSessions=16, Timeout=20)."

Figure 13:
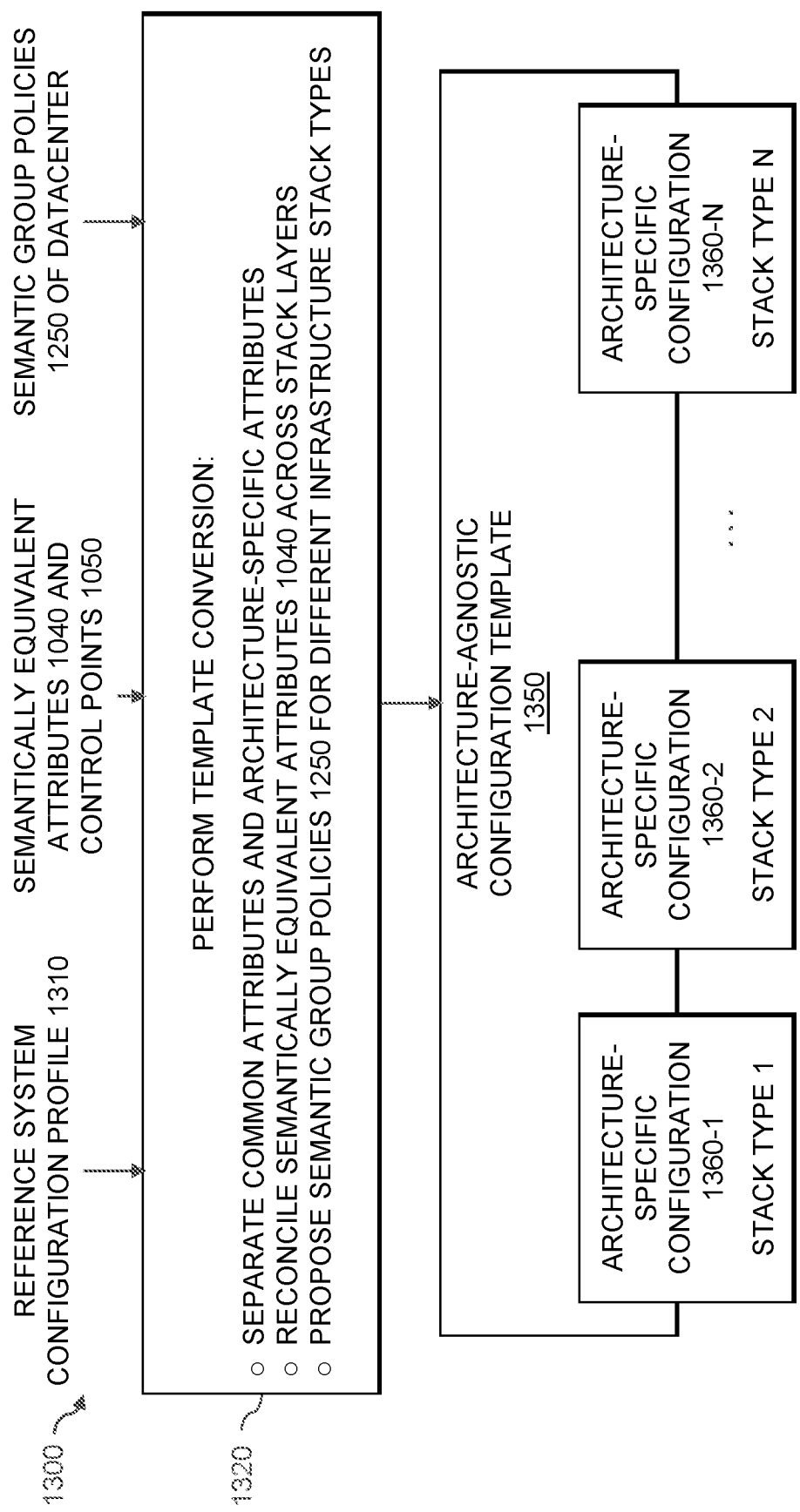
FIG. 13 is a flow chart illustrating an exemplary process for generating architecture-agnostic configuration templates in accordance with an illustrative embodiment.

FIG. 13 is a flow chart illustrating an exemplary process 1300 for generating architecture-agnostic configuration templates in accordance with an illustrative embodiment. The process 1300 processes a reference system configuration profile 1310, the semantically equivalent attributes 1040 and control points 1050 from the process 1000 of FIG. 10A, and the semantic group policies 1250 of a datacenter, as generated by the process 1200 of FIG. 12A.

In the example of FIG. 13, the process 1300 performs a template conversion in step 1320 that comprises separating the common attributes and the architecture-specific attributes; reconciling the semantically equivalent attributes 1040 across stack layers; and proposing semantic group policies 1250 for different infrastructure stack types. The template conversion performed in step 1320 generates an architecture-agnostic configuration template 1350 comprising (i) a first portion that configures one or more of the common attributes, and (ii) a plurality of second portions comprising an architecture-specific configuration 1360-1 through 1360-N of one or more of the architecture-specific attributes for a corresponding architecture-specific infrastructure stack type.

In one or more embodiments, the disclosed techniques for generating multi-layer configuration templates for multiple architectures in infrastructure stacks discover semantic equivalence of attributes across architecture elements (both within a layer of a stack and across layers of stack) and identify the location where the attribute can be modified. Attributes are grouped together with related capabilities and semantic groups are used to discovering how IT administrators configure technology-specific infrastructure stacks.

In some embodiments, the templatization technique of FIG. 13 separates architecture-agnostic components from architecture-dependent components and proposes well-defined semantic properties for a given infrastructure stack. In this manner, architecture-agnostic configuration templates are created that adapt to multiple diverse architectures based on IT usage patterns.

Figure 14:
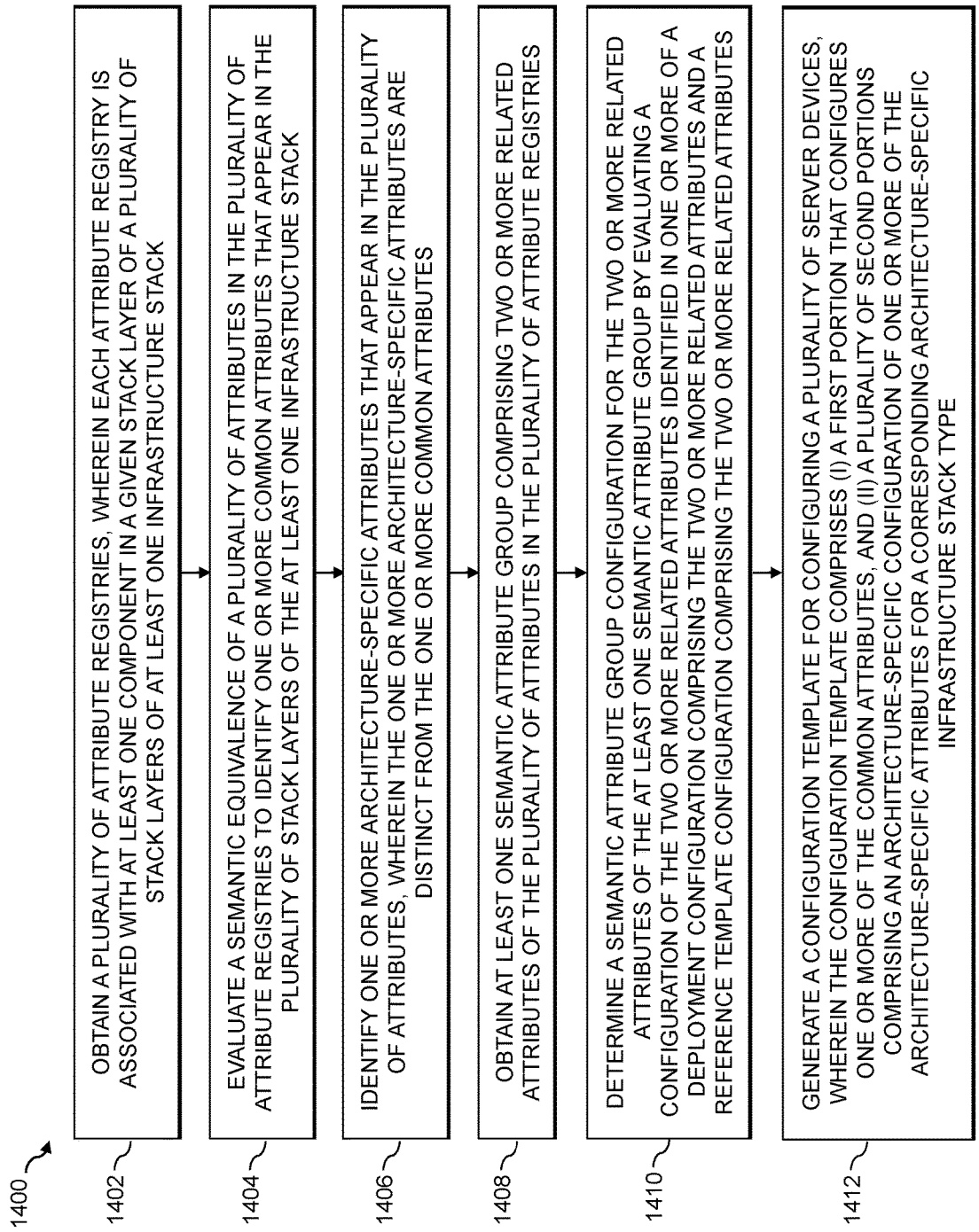
FIG. 14 is a flow chart illustrating an exemplary implementation of a process for generating multi-layer configuration templates for deployment across multiple infrastructure stack layers in accordance with an illustrative embodiment.

FIG. 14 is a flow chart illustrating an exemplary implementation of a process 1400 for generating multi-layer configuration templates for deployment across multiple infrastructure stack layers in accordance with an illustrative embodiment. In the example of FIG. 14, the process 1400 initially obtains a plurality of attribute registries in step 1402, wherein each attribute registry is associated with at least one component in a given stack layer of a plurality of stack layers of at least one infrastructure stack. In step 1404, a semantic equivalence of a plurality of attributes in the plurality of attribute registries is devaluate to identify one or more common attributes that appear in the plurality of stack layers of the at least one infrastructure stack.

The process 1400 identifies one or more architecture-specific attributes that appear in the plurality of attributes in step 1406, wherein the one or more architecture-specific attributes are distinct from the one or more common attributes. At least one semantic attribute group is obtained in step 1408 comprising two or more related attributes of the plurality of attributes in the plurality of attribute registries. A semantic attribute group configuration is determined in step 1410 for the two or more related attributes of the at least one semantic attribute group by evaluating a configuration of the two or more related attributes identified in one or more of a deployment configuration comprising the two or more related attributes and a reference template configuration comprising the two or more related attributes.

A configuration template for configuring a plurality of server devices is generated in step 1412, wherein the configuration template comprises (i) a first portion that configures one or more of the common attributes using a configuration of the one or more common attributes in the reference template configuration for at least two of the stack layers of the plurality of stack layers, and (ii) a plurality of second portions, wherein each second portion comprises an architecture-specific configuration, based at least in part on the semantic attribute group configuration, of one or more of the architecture-specific attributes for a corresponding architecture-specific infrastructure stack type of a plurality of architecture-specific infrastructure stack types.

In some embodiments, the related attributes of the at least one semantic attribute group relate to a given feature and/or a given function associated with the at least one infrastructure stack.

The semantic attribute group configuration for the two or more related attributes of the at least one semantic attribute group can be determined in some embodiments using the semantic attribute group configuration for one or more new attributes in the two or more related attributes that do not appear in the reference template using the deployment configuration.

The particular processing operations and other functionality described in conjunction with FIGS. 6, 10A, 11A, 12A, 13 and 14 are presented by way of illustrative example only, and should not be construed as limiting the scope of the disclosure in any way. Alternative embodiments can use other types of processing operations for generating multi-layer configuration templates for deployment across multiple infrastructure stack layers. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

For additional details related to management, configuration, update, security, deployment and/or processing of infrastructure stacks, see, for example, U.S. patent application Ser. No. 17/586,073, filed Jan. 27, 2022, entitled "Server Device Updates Using Update Baselines Tagged Across Multiple Management Consoles," U.S. patent application Ser. No. 17/586,099, filed Jan. 27, 2022, entitled "Identifying and Mitigating Security Vulnerabilities in Multi-Layer Infrastructure Stacks," and/or U.S. Patent Application Ser. No. 17/586,124, filed Jan. 27, 2022, entitled "Semantic-Aware Workflow Creation and Execution," each filed contemporaneously herewith and incorporated by reference herein in its entirety.

One or more embodiments of the disclosure provide improved methods, apparatus and computer program products for generating multi-layer configuration templates for deployment across multiple infrastructure stack layers. The foregoing applications and associated embodiments should be considered as illustrative only, and numerous other embodiments can be configured using the techniques disclosed herein, in a wide variety of different applications.

It should also be understood that the disclosed multi-layer configuration template generation, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for multi-layer configuration template generation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-layer configuration template generation engine, or portions thereof, are illustratively implemented for use by tenants of such a multi-tenant environment.

Virtual machines provided in cloud-based systems can be used to implement at least portions of a cloud-based multi-layer configuration template generation platform in illustrative embodiments. The cloud-based systems can include, for example, object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 15 and 16. These platforms may also be used to implement at least portions of other information processing systems in other embodiments.

Figure 15:
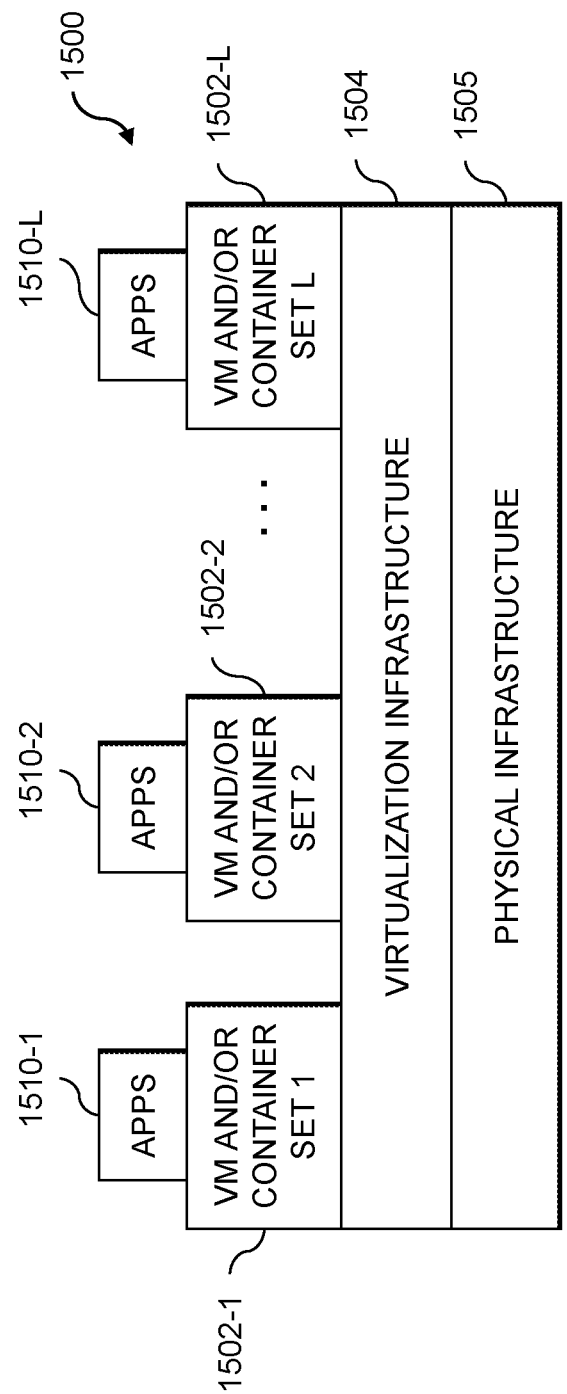
FIG. 15 illustrates an exemplary processing platform that may be used to implement at least a portion of one or more embodiments of the disclosure comprising a cloud infrastructure.

FIG. 15 shows an example processing platform comprising cloud infrastructure 1500. The cloud infrastructure 1500 comprises a combination of physical and virtual processing resources that may be utilized to implement at least a portion of the information processing system 100. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 may comprise respective VMs, respective sets of one or more containers, or respective sets of one or more containers running in VMs.

In some implementations of the FIG. 15 embodiment, the VMs/container sets 1502 comprise respective VMs implemented using virtualization infrastructure 1504 that comprises at least one hypervisor. Such implementations can provide multi-layer configuration template generation functionality of the type described above for one or more processes running on a given one of the VMs. For example, each of the VMs can implement multi-layer configuration template generation control logic and server configuration deployment functionality for one or more processes running on that particular VM.

An example of a hypervisor platform that may be used to implement a hypervisor within the virtualization infrastructure 1504 is the VMware® vSphere® which may have an associated virtual infrastructure management system such as the VMware® vCenter™. The underlying physical machines may comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system. Such implementations can provide multi-layer configuration template generation functionality of the type described above for one or more processes running on different ones of the containers. For example, a container host device supporting multiple containers of one or more container sets can implement one or more instances of multi-layer configuration template generation control logic and server configuration deployment functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises at least a portion of the given system and includes a plurality of processing devices, denoted 1602-1, 1602-2, 1602-3, . . . 1602-K, which communicate with one another over a network 1604. The network 1604 may comprise any type of network, such as a WAN, a LAN, a satellite network, a telephone or cable network, a cellular network, a wireless network such as WiFi or WiMAX, or various portions or combinations of these and other types of networks.

The processing device 1602-1 in the processing platform 1600 comprises a processor 1610 coupled to a memory 1612. The processor 1610 may comprise a microprocessor, a CPU, a GPU, a TPU, a microcontroller, an ASIC, an FPGA or other type of processing circuitry, as well as portions or combinations of such circuitry elements, and the memory 1612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and the given system may include additional or alternative processing platforms, as well as numerous distinct processing platforms in any combination, with each such platform comprising one or more computers, storage devices or other processing devices.

Figure 16:
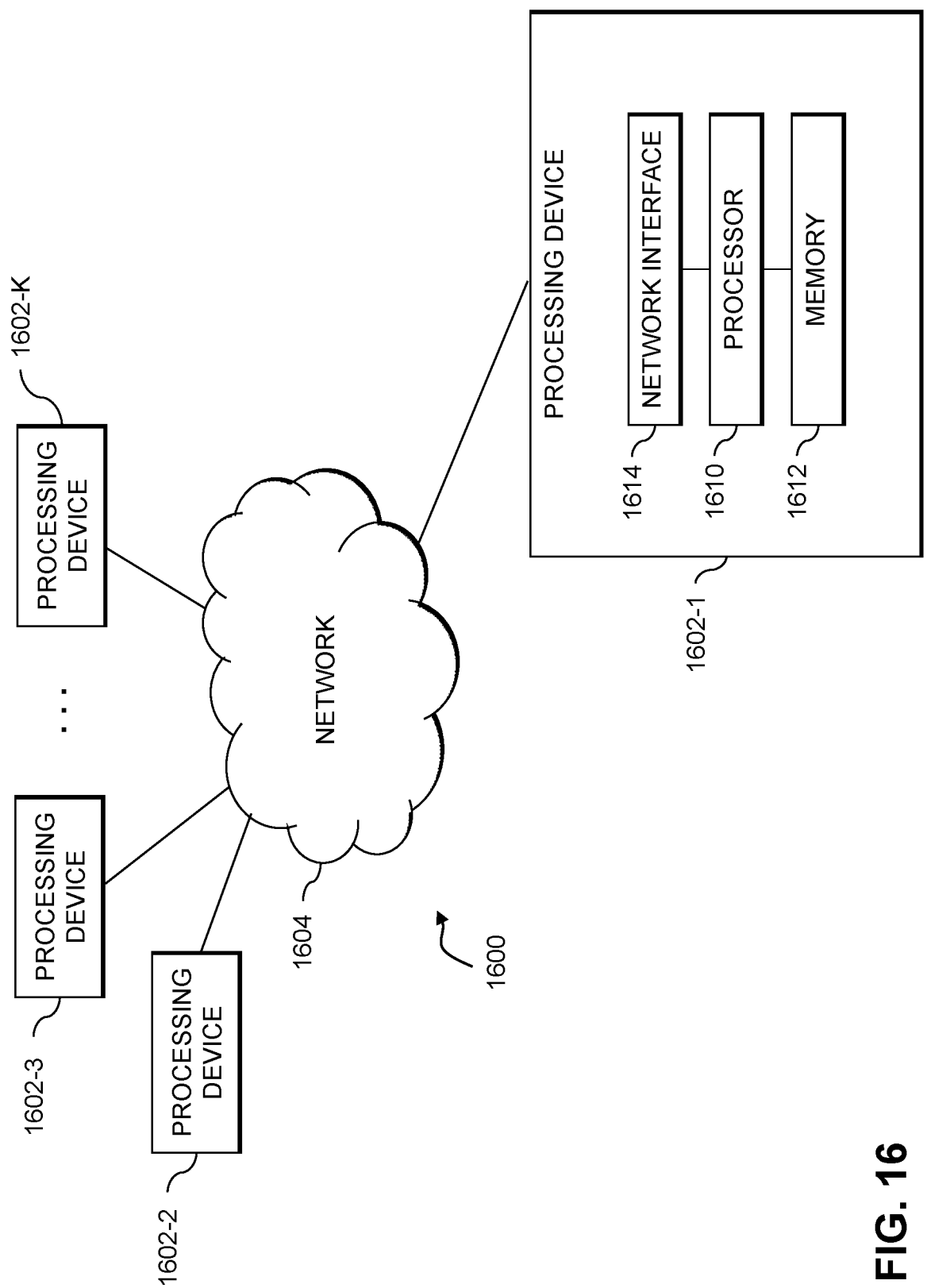
FIG. 16 illustrates another exemplary processing platform that may be used to implement at least a portion of one or more embodiments of the disclosure.

Multiple elements of an information processing system may be collectively implemented on a common processing platform of the type shown in FIG. 15 or 16, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a plurality of attribute registries, wherein each attribute registry is associated with at least one component in a given stack layer of a plurality of stack layers of at least one infrastructure stack;
evaluating a semantic equivalence of a plurality of attributes in the plurality of attribute registries to identify one or more common attributes that appear in the plurality of stack layers of the at least one infrastructure stack;
identifying one or more architecture-specific attributes that appear in the plurality of attributes, wherein the one or more architecture-specific attributes are distinct from the one or more common attributes;
obtaining at least one semantic attribute group comprising two or more related attributes of the plurality of attributes in the plurality of attribute registries;

determining a semantic attribute group configuration for the two or more related attributes of the at least one semantic attribute group by evaluating a configuration of the two or more related attributes identified in one or more of a deployment configuration comprising the two or more related attributes and a reference template configuration comprising the two or more related attributes; and generating a configuration template for configuring a plurality of server devices, wherein the configuration template comprises (i) a first portion that configures one or more of the common attributes using a configuration of the one or more common attributes in the reference template configuration for at least two of the stack layers of the plurality of stack layers, and (ii) a plurality of second portions, wherein each second portion comprises an architecture-specific configuration, based at least in part on the semantic attribute group configuration, of one or more of the architecture-specific attributes for a corresponding architecture-specific infrastructure stack type of a plurality of architecture-specific infrastructure stack types;

wherein the method is performed by at least one processing device comprising a processor coupled to a memory.

2. The method of claim 1, further comprising identifying at least one control point location in a particular stack layer of the plurality of stack layers where a given common attribute can be modified and configuring the given common attribute in the particular stack layer.

3. The method of claim 2, wherein the given common attribute can be modified at a control point location in multiple stack layers of the plurality of stack layers and further comprising prioritizing the plurality of the control point locations based at least in part on a hierarchy of the plurality of stack layers.

4. The method of claim 1, wherein the two or more related attributes of the at least one semantic attribute group relate to one or more of a given feature and a given function associated with the at least one infrastructure stack.

5. The method of claim 1, wherein the determining the semantic attribute group configuration for the two or more related attributes of the at least one semantic attribute group further comprises determining the semantic attribute group configuration for one or more new attributes in the two or more related attributes that do not appear in the reference template using the deployment configuration.

6. The method of claim 1, further comprising initiating an application of the configuration template to configure at least one of the plurality of server devices.

7. The method of claim 6, wherein the at least one of the plurality of server devices is associated with a given architecture-specific infrastructure stack type and wherein the configuration template applied to the at least one of the plurality of server devices comprises the second portion corresponding to the given architecture-specific infrastructure stack type.

8. An apparatus comprising:
at least one processing device comprising a processor coupled to a memory;
the at least one processing device being configured to implement the following steps:
obtaining a plurality of attribute registries, wherein each attribute registry is associated with at least one component in a given stack layer of a plurality of stack layers of at least one infrastructure stack;

evaluating a semantic equivalence of a plurality of attributes in the plurality of attribute registries to identify one or more common attributes that appear in the plurality of stack layers of the at least one infrastructure stack;

identifying one or more architecture-specific attributes that appear in the plurality of attributes, wherein the one or more architecture-specific attributes are distinct from the one or more common attributes;

obtaining at least one semantic attribute group comprising two or more related attributes of the plurality of attributes in the plurality of attribute registries;

determining a semantic attribute group configuration for the two or more related attributes of the at least one semantic attribute group by evaluating a configuration of the two or more related attributes identified in one or more of a deployment configuration comprising the two or more related attributes and a reference template configuration comprising the two or more related attributes; and generating a configuration template for configuring a plurality of server devices, wherein the configuration template comprises (i) a first portion that configures one or more of the common attributes using a configuration of the one or more common attributes in the reference template configuration for at least two of the stack layers of the plurality of stack layers, and (ii) a plurality of second portions, wherein each second portion comprises an architecture-specific configuration, based at least in part on the semantic attribute group configuration, of one or more of the architecture-specific attributes for a corresponding architecture-specific infrastructure stack type of a plurality of architecture-specific infrastructure stack types.

9. The apparatus of claim 8, further comprising identifying at least one control point location in a particular stack layer of the plurality of stack layers where a given common attribute can be modified and configuring the given common attribute in the particular stack layer.

10. The apparatus of claim 8, wherein the two or more related attributes of the at least one semantic attribute group relate to one or more of a given feature and a given function associated with the at least one infrastructure stack.

11. The apparatus of claim 8, wherein the determining the semantic attribute group configuration for the two or more related attributes of the at least one semantic attribute group further comprises determining the semantic attribute group configuration for one or more new attributes in the two or more related attributes that do not appear in the reference template using the deployment configuration.

12. The apparatus of claim 8, further comprising initiating an application of the configuration template to configure at least one of the plurality of server devices.

13. The apparatus of claim 12, wherein the at least one of the plurality of server devices is associated with a given architecture-specific infrastructure stack type and wherein the configuration template applied to the at least one of the plurality of server devices comprises the second portion corresponding to the given architecture-specific infrastructure stack type.

14. A non-transitory processor-readable storage medium having stored therein program code of one or more software programs, wherein the program code when executed by at least one processing device causes the at least one processing device to perform the following steps:
obtaining a plurality of attribute registries, wherein each attribute registry is associated with at least one component in a given stack layer of a plurality of stack layers of at least one infrastructure stack;

evaluating a semantic equivalence of a plurality of attributes in the plurality of attribute registries to identify one or more common attributes that appear in the plurality of stack layers of the at least one infrastructure stack;

identifying one or more architecture-specific attributes that appear in the plurality of attributes, wherein the one or more architecture-specific attributes are distinct from the one or more common attributes;

obtaining at least one semantic attribute group comprising two or more related attributes of the plurality of attributes in the plurality of attribute registries;

determining a semantic attribute group configuration for the two or more related attributes of the at least one semantic attribute group by evaluating a configuration of the two or more related attributes identified in one or more of a deployment configuration comprising the two or more related attributes and a reference template configuration comprising the two or more related attributes; and generating a configuration template for configuring a plurality of server devices, wherein the configuration template comprises (i) a first portion that configures one or more of the common attributes using a configuration of the one or more common attributes in the reference template configuration for at least two of the stack layers of the plurality of stack layers, and (ii) a plurality of second portions, wherein each second portion comprises an architecture-specific configuration, based at least in part on the semantic attribute group configuration, of one or more of the architecture-specific attributes for a corresponding architecture-specific infrastructure stack type of a plurality of architecture-specific infrastructure stack types.

15. The non-transitory processor-readable storage medium of claim 14, further comprising identifying at least one control point location in a particular stack layer of the plurality of stack layers where a given common attribute can be modified and configuring the given common attribute in the particular stack layer.

16. The non-transitory processor-readable storage medium of claim 15, wherein the given common attribute can be modified at a control point location in multiple stack layers of the plurality of stack layers and further comprising prioritizing the plurality of the control point locations based at least in part on a hierarchy of the plurality of stack layers.

17. The non-transitory processor-readable storage medium of claim 14, wherein the two or more related attributes of the at least one semantic attribute group relate to one or more of a given feature and a given function associated with the at least one infrastructure stack.

18. The non-transitory processor-readable storage medium of claim 14, wherein the determining the semantic attribute group configuration for the two or more related attributes of the at least one semantic attribute group further comprises determining the semantic attribute group configuration for one or more new attributes in the two or more related attributes that do not appear in the reference template using the deployment configuration.

19. The non-transitory processor-readable storage medium of claim 14, further comprising initiating an application of the configuration template to configure at least one of the plurality of server devices.

20. The non-transitory processor-readable storage medium of claim 19, wherein the at least one of the plurality of server devices is associated with a given architecture-specific infrastructure stack type and wherein the configuration template applied to the at least one of the plurality of server devices comprises the second portion corresponding to the given architecture-specific infrastructure stack type.

* * * * *